May 23, 1967     F. J. VON DELDEN     3,321,688
A.C./D.C. FED TRANSISTORIZED INDUCTION MOTORS
Filed Oct. 14, 1965
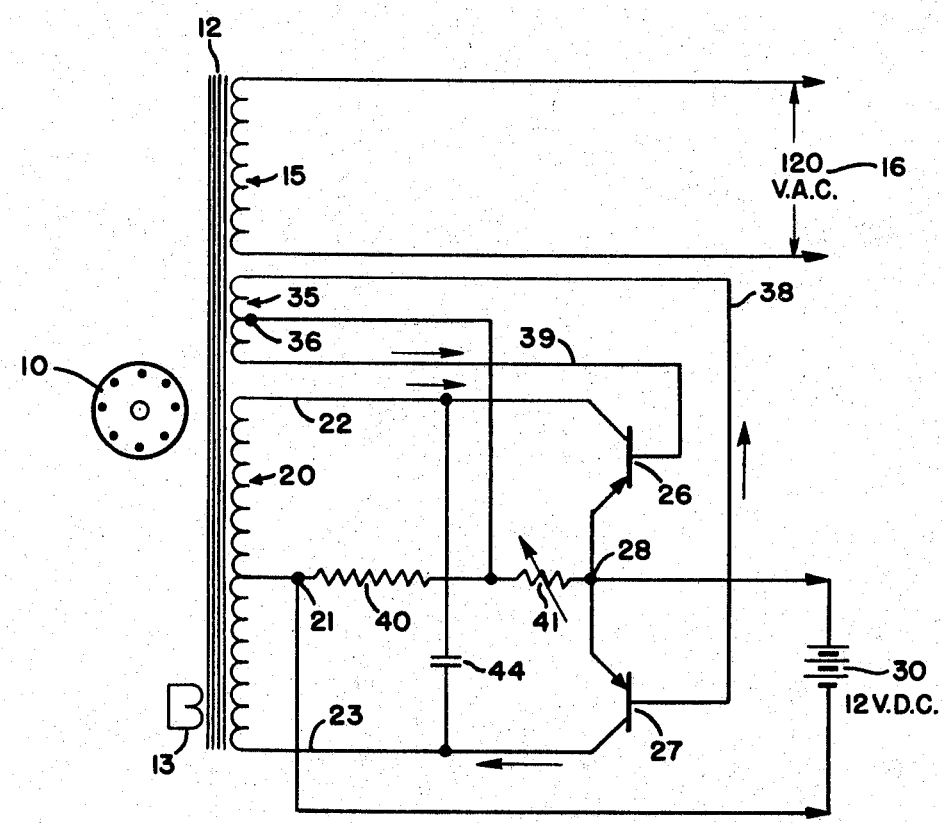
INVENTOR.
FLORENS J. von DELDEN
BY
*Marchal, Biebel, French & Bugg*
ATTORNEYS

United States Patent Office 3,321,688
Patented May 23, 1967

3,321,688
A.C./D.C. FED TRANSISTORIZED INDUCTION MOTORS
Florens J. von Delden, Glendale, Calif., assignor to The Lau Blower Company, Dayton, Ohio, a corporation of Ohio
Filed Oct. 14, 1965, Ser. No. 495,928
7 Claims. (Cl. 318—138)

This invention relates to transistorized brushless induction motors and more particularly to such a motor which is adapted for operation from a conventional alternating current source and from a D.C. source, such as a battery.

There is an increasing requirement for a "universal" motor which operates equally well from A.C. or from D.C. but which is free of the problems associated with commutation, including electrical noise, limited brush life, carbon dust, and the necessity for special shielding when used in an explosive atmosphere. Such motors have particular use where battery power is available at one time, and conventional alternating current power avaliable at other times. Universal motors of the brush type which are wound for use on 120 v. or higher A.C. line voltage have insufficient power when run from a 12- or 24-volt battery. Conversely, a brush-type low voltage D.C. motor cannot be operated directly from the power line without overspeeding and being in danger of burning out.

The comparatively shorter useful life of a brush-type motor, as compared to an induction motor, is of further disadvantage when the motor is to be in substantially constant use, such as for air moving requirements in the refrigeration or heating appliances within a travel trailer or camper, and for hold, bilge, engine and fuel tank compartment ventilation in a boat. For example, U.S. Coast Guard Regulations and state laws now require explosion proof exhaust blower motor ventilation in certain classes of water craft, and these are used continuously while the boat is being run, and often, when docked. One of the important advantages of this invention is the provision of a motor which operates equally well from conventional alternating current or conventional low-voltage direct current, and which eliminates all brushes and mechanical commutation. A further important advantage of this invention is that the motor and associated circuit may be used to charge the battery while the motor is being operated from the conventional A.C. source.

These important objects and advantages are met by the provision of an induction motor which incorporates a drive circuit by which the motor may be operated directly from an A.C. source and by which it may be operated directly from a lower voltage D.C. source, with comparable efficiency and speed. As a further advantage, the D.C. drive circuit portion may remain associated with the motor during the times when it is driven from the A.C. source and provides a rectifier D.C. output voltage which can be used directly to charge a battery without the necessity for reversing or changing any of the electrical connections.

It is accordingly an important object of this invention to provide an induction motor having a control circuit which permits the motor to be run with comparable efficiency from either an A.C. or a D.C. source.

A further object of the invention is the provision in an induction motor of a self-oscillating or switching D.C. to A.C. converted which also operates as an inverter to apply a charging current to a battery.

A still further object of this invention is the provision of an induction motor which includes a transistorized switching circuit which is operated in one mode to apply a square-wave A.C. current to the motor stator and which is energized when the motor is operated from an A.C. winding to effect full-wave rectification through the transistors so that a reverse voltage is formed at the points of connection to a D.C. source which can be used either to supply current to the source or at least to equal the voltage from the source so that substantially no power is drawn from the D.C. source when the motor is on A.C. operation.

These and other objects and advantages of the present invention will become apparent from the following description, the accompanying drawing and the appended claims.

The single figure of the drawing is a schematic wiring diagram of a shaded pole induction motor constructed according to this invention. In this diagram, the motor is shown as having a rotor 10 which is inductively associated with a stator 12. The motor is also shown as having a short-circuited shaded pole winding 13. However, the induction motor may be of any other suitable type, such as split phase or capacitor start, or capacitor start and run. Also, the invention is not limited to any particular type of induction rotor. For instance, the rotor may be of the squirrel cage type with aluminum or copper bars, or may be wire wound. However, the invention is particularly useful in fractional horsepower, shaded pole, squirrel cage motors, which may be made at low cost and which have long life; the normal life of the motor usually being limited by the life of the bearings.

A first stator winding 15 comprises a line winding for connection directly to a source 16 of conventional alternating current, such as 120 volts, 60 cycles per second. Accordingly, this winding has a comparatively high number of turns of comparatively fine wire linearly wound on the stator, and is adequate to effect direct operation of the motor and the rotor 10 from the source 16.

The stator 12 further includes a second or main winding 20. The winding 20 could be wound bifilar, linear or equivalent, with a center tap at 21, and is formed with end leads 22 and 23. When the voltage of the D.C. source is less than that of the A.C. source, the winding 20 has comparatively fewer turns of heavier wire as compared to the winding 15.

The winding 20 is driven from a converter circuit which includes a pair of power transistors each of which have their emitter-collector circuits connected effectively in series with one-half of the winding 20 and also defining a common connection. Thus, the transistor 26 has its collector connected to the lead 22 and the transistor 27 has its collector connected to the lead 23, while the emitters are connected together in common at 28. The arrangement is such that the transistors 26 and 27 are connected in effective push-pull relation with the winding 20 so that the transistor 26 conducts through the portion of the winding between the center tap 21 and lead 22, and the transistor 27 conducts through the portion of the winding 20 between the lead 23 and center tap 21.

A D.C. source 30 is applied with the positive lead thereof connected at the terminal 28 formed at the common emitter junction, and the negative lead connected to the terminal formed at the center tap 21. As shown, the D.C. source 30 may comprise a 12 volt battery. For instance, the motor may be used for hold, bilge, engine compartment ventilation, sump pump or fuel pump operation in a boat, or for use in the heating and cooling equipment in a mobile home, or the like. The source 30 would then conveniently be the battery which is carried on the boat or in the mobile home, while the alternating current source 16 would be supplied when the boat is in dock or the mobile home is connected to outside facilities. The battery 30 may remain in the circuit at all times when the motor is being driven from the A.C. source.

The stator includes a further winding in the form of a control winding 35 which is also center tapped at 36 and wound bifilar or the like to form, in effect, two separate control windings. The opposite leads 38 and 39 of the winding 35 are connected, respectively, to the bases of the transistors 26 and 27. The center tap 36 of winding 35 is connected to the junction of a voltage divider consisting of resistors 40 and 41 which are connected effectively across the source 30 between the center tap 21 and the junction 28. The resistors 40 and 41 provide a bias voltage for the transistors 26 and 27. Resistor 41 limits the drive current to the transistor bases, and may be either fixed, or variable as shown, and as described in further detail below.

A capacitor 44 is connected electrically across the winding 20. One of the purposes of this capacitor is to remove harmful transient switching spikes which may otherwise damage the transistors in the circuit.

It is within the scope of this invention to utilize a frequency controlled transistor switching circuit as in the co-pending application of Von Delden and Wood, Ser. No. 348,672, filed Mar. 20, 1964 and assigned to the same assignee as this invention, in which the frequency of oscillation or switching is varied in relation to the saturation of the stator to providing lower switching frequency at high stator currents, to improve the starting and the pull-out characteristic when operated on direct curent. It is also within the scope of this invention to use multiple drive transistors 26 and 27 connected in parallel in order more effectively to carry the switching current, and to provide a separate switching transformer and drive transistors for the power transistors, all as shown in my co-pending application Ser. No. 394,468 filed Sept. 4, 1964, and assigned to the same assignee as this invention. Also, Zener diodes may be used in lieu of or in addition to the capacitor 44, as shown in my application Ser. No. 394,468.

When the motor is operated directly from the source 30, one of the transistors 26 or 27 will become conductive due to any unbalance existing in the circuit. Assuming that transistor 27 is conducting current from its collector to its emitter, transistor 26 will not be conducting. This instantaneous condition is represented by the arrows on the circuit diagram. In this condition, transistor 27 presents a small impedance while transistor 26 presents a large impedance. The base drive winding 35 is connected in such a way that positive feed-back is applied to the transistors and, therefore, when transistor 27 conducts, the positive feed-back drives it completely to saturation.

After a finite time of conduction, the stator core 12 of the motor experiences magnetic saturation and the collector current rises sharply due to the increased inductance of the motor winding connected in the collector circuit. At the point of magnetic saturation, no further flux change in the stator is possible, and the base drive voltage ceases to be induced. This causes the conducting transistor to switch off and, by transformer action, the turn-off transient becomes the turn-on transient to the base of the other transistor 26. Thus, it can be seen that the circuit is self-sustaining and oscillates with a square-wave form.

The switching frequency is determined by the magnitude of the source 30, and the inductive reactance of the drive winding 20. The number of turns in the winding 20 is preferably chosen in relation to the magnitude of the source 30 and also in proper relationship to the 120 volt A.C. winding 15 in order to obtain the correct charging voltage so as to provide a desired switching rate, while the size of the wire comprising the turns is chosen as to provide the required power input into the stator.

The transistorized switching circuit which has been described also is used during the times that the motor is being driven from the A.C. source 16 to apply a charge to the battery 30. While the induced signal in the control winding 35 remains the same, in the sense that the instantaneous polarity of the induced signal remains the same, this is not true for the main winding 20. Here, the instantaneous polarity is now reversed as compared to the polarity when the motor is being driven from the direct current source 30. In other words, the voltages induced in the winding 20 form alternate back or reverse voltages on the transistors 26 and 27. However, since the transistor bases continue under the control of the switching or control winding 35, they are biased alternately in conductive and cut-off states and are held conductive during the times that they are back-biased by the halves of the winding 20.

In further explanation, when the A.C. source 16 is applied across the motor winding 20 through the transformer section of the stator 12, both transistors operate in the reverse sense of current flow. This is possible since junction transistors can operate as symmetrical devices with the emitter and collector terminals being interchanged. Current can flow in the reverse direction through the transistors and in response to the voltage developed across the winding 20 if the voltage is greater than the voltage of the battery 30. The charging current which is accordingly applied to the battery 30 consists of full-wave rectified current which is at least partially filtered by the capacitor 44.

It is important that the turns ratio between the windings 15 and 20 be considered in designing the motor so that the correct voltage appears across the alternate halves of the winding 20, when it is being energized inductively from the stator 12. Since the number of turns on the winding 20 also has a direct bearing upon the operation of the motor from the direct current source, and particularly on the switching rate according to the well-known motor formula:

Where $V = 4.44\ B\ a\ f\ N \times 10^{-5}$
V = applied voltage (volts)
B = flux density (kilogauss)
$a$ = area of core in square centimeters
$f$ = operating frequency (c./s.)
N = number of turns, it is therefore preferable to vary and cotrol the turns in the first winding 15 so as to provide the desired turns ratio. For example, when operating off of 120 volts A.C. and 12 volts D.C., respectively, a turns ratio of 10:1 between the winding 15 and one-half of the winding 20 has been found to be effective. The capacitor 44 will charge to peak value during A.C. operation and will provide a corresponding increase over the R.M.S. value of the induced voltage. From a practical standpoint, the resistor 41 is included to limit the drive current to the transistor bases, while the resistor 40 effects the initial oscillation by forward biasing both transistors 26 and 27 simultaneously. Whichever transistor has the highest gain will saturate first and therefore begin the oscillation.

Since the variable resistor 41 is in series with the incoming D.C. current, it will effect the voltage drop in the direction that it is connected. When the motor is operated on A.C. from the surce 16, resistor 41 will again register a voltage drop in the direction of battery connection. Therefore, the realistic charging current produced by the motor and its coil ratio relationship is reduced by the voltage drop through this resistor. By using the variable resistor it has been found that the total resistance can be reduced to the point where the D.C. charging rate in amperes is equal to the A.C. input current. Accordingly, the resistor 41 provides the means by which the D.C. charging current can be regulated and can be varied. Further, when the motor is run on D.C., the speed and torque can be substantially varied by varying the value of the resistor 41. However, in many applications, the charging rate with a fixed resistor would be sufficient.

As the charge on the battery 30 approaches the peak value across the capacitor 44, the charging rate progressively decreases until the point is reached at which no further current flows either to or from the battery. Accordingly, the circuit provides a highly efficient battery charger when the motor is being operated from the A.C. source which is inherently self-regulating. There is therefore no need for disconnecting the battery 30 as long as the motor is being operated from the source 16, and the battery can thus be kept at full charge over extended periods of time. In addition, the winding 15 provides a source of alternating current having a frequency and voltage comparable to that of the alternating current source 16 during the times when the motor is being operated from the direct current source 30. Although the amount of A.C. current which can thus be supplied is limited to the excess of power which is available through the transistors, this A.C. power may be highly advantageous for operating low power lamps, indicators, or appliances, such as electrical razors or the like, when line power is not otherwise available or convenient.

As has been noted above, the winding 20 may be bifilar or linear, and the center tap may be achieved by the well-known method of connecting the opposite leads 22 and 23 together with a pair of resistors to form a "floating" center tap. In addition, a linear winding may have some advantages since, as each half of the winding has the same number of turns, the second half will have a higher total resistance since the diameter of the winding turns increases with the number of turns. The first half, having the lower resistance, tends to have the higher current and therefore it may initially develop the higher flux. This may have some distinct advantages in initiating oscillations as providing an inherent unbalance to the system which is essential to automatic starting of oscillation.

It s preferable to use drive transistors 26 and 27 of relatively high beta to assure starting under adverse conditions. Also, although PNP transistors are shown, NPN transistors may be used by reversing the battery and transistor connections.

In a shaded pole motor made according to this invention, it is preferable to position each of the windings as close to the magnetic core of the stator 12 as possible, and for this purpose a divided spool may be used with the windings 20 and 35 placed on one side of the divider and the winding 15 placed on the other side. Instead, two separate winding spools may be used for the respective windings 15 and 20. However, a satisfactory shaded pole motor may be made by winding the A.C. winding 15 over the windings 20 and 35 with slight decrease in efficiency and increase in heating due to the larger flux path for the winding 15.

It is therefore seen that this invention provides a "universal" induction motor which not only is adapted for operation from either A.C. or D.C., but which is specifically adapted for operation from sources of widely differing voltages and which further provides a D.C. current when it is operated from the A.C. source, and an A.C. current when it is operated from the D.C. source. The motor may be made with low cost components at only a slight increase over conventional A.C. motors, but with a substantial increase in reliability, versatility, and life over conventional brush-type motors. Further, the motor is free of spark hazards and radio static, and does not require special shielding for use in an explosive atmosphere, such as in the hold of a ship, or when used to drive a fuel pump.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An induction motor for operation from a source of conventional alternating current or from a battery, comprising a stator, and a rotor inductively associated with said stator, a first winding on said stator adapted for connection to such alternating current source to operate said motor directly from said source, a second winding on said stator, a transistor switching circuit having transistors connected to said second winding and further having a common connection to such battery for applying current flow from the battery to said second winding first in one flux producing direction and then in the other at a switching rate which is approximately equal to the frequency of the alternating current for operating said motor at substantially the same speed and torque as compared to operation on said first winding, said second winding being inductively energized during the times that said motor is operating on said first winding inducing alternate back voltages across the emitter-collector circuits of each of said transistors, and circuit switching means including a further winding on said stator and having a connection to the bases of said transistors for causing said transistors alternately to become conductive as symmetrical devices during the times they are back biased for effecting full wave rectification of the output from said second winding when it is so energized as a charging current to the battery.

2. An induction motor adapted for operation from a conventional alternating current supply and from a D.C. source comprising a rotor, a stator operatively associated with said rotor having a first winding thereon adapted for connection to said A.C. supply to drive said rotor, a second winding on said stator having means forming a center tap, a pair of switching transistors each having its emitter-collector circuit connected across one-half of said second winding for providing alternate conduction through said second winding halves, control winding means inductively associated with said stator and having connections with the bases of said transistors to effect alternate conduction thereof with flux reversals in said stator, means adapted for connecting said D.C. source between a point common to each of said transistors and to said center tap to effect alternate conduction through said transistors to drive said motor therefrom, and the turns ratio between said first and second windings providing a full wave rectified voltage at said D.C. source connection means at least equal to the voltage of said D.C. source by reverse conduction through said transistors as symmetrical conducting devices when said motor is driven by the alternating current supply being applied to said first winding.

3. An induction motor adapted for selective use on either conventional alternating current or from a battery comprising a stator, a rotor inductively associated with said stator, a first winding on said stator adapted to be connected to such alternating current for driving said rotor, a second winding on said stator having means defining a center tap, at least a pair of switching transistors connected in current controlling relation to said second winding there being at least one of said transistors connected in current controlling relation with each half of said second winding and providing for current flow first in one flux producing direction and then in the other flux producing direction through said second winding, a control winding on said stator connected to effect control of the base currents of said transistors to effect switching thereof with flux reversals in said stator, means between said center tap on said second winding and said transistors adapted for connection to such battery providing for direct current flow alternately through said transistors and said second winding to effect operation of said motor from said battery, and said second winding being inductively energized in a reverse sense during the times when said motor is being operated on said first winding providing a full wave rectified D.C. charging current through said transistors to said battery.

4. An induction motor and motor drive circuit for operating an induction motor from a D.C. source and from an A.C. source, comprising a shaded pole motor having a stator, an induction rotor, a first winding on said stator having a comparatively high number of turns of relatively fine wire adapted for connecting directly to such A.C. source for operating said motor, a second winding on said stator having a comparatively fewer number of turns of heavier wiring as compared to said first winding, a converter including power transistors connected to said second winding in driving relation therethrough and through said winding to said D.C. source, further winding means on said stator connected to control the base currents of said transistors in response to reversals in the flux of said stator for effecting alternate switching of said transistors from a conductive state to a non-conductive state for applying a substantially square wave voltage to said second stator winding from said D.C. source, said second winding being inductively energized by transformer action during the times when said motor is operated from said first winding, and said first and second windings having a turns ratio which corresponds generally to the voltage ratio between said A.C. source and said D.C. source for effecting a full-wave rectification through said transistors conducting as symmetrical conducting devices resulting in an output voltage therefrom at the points of connection of said D.C. source which is at least equal to the voltage of said D.C. source.

5. An induction motor adapted for selective use on either conventional alternating current or on a battery comprising a stator, a rotor inductively associated with said stator, a first winding on said stator adapted to be connected to such alternating current for driving said rotor, a second winding on said stator having means defining a center tap, a pair of switching transistors having a common connection in their emitter-collector circuits and each further connected in current controlling relation to one half of said second winding providing for current flow first in one flux producing direction through said second winding and then in the other flux producing direction, a control winding on said stator and having means connected to effect control of the base currents of said transistors to effect switching thereof with flux reversals in said stator, means between said second winding center tap and common transistor connection forming terminals for connection to such battery providing for direct current flow alternately through said transistors and said second winding to effect operation of said motor from said battery, said second winding being inductively energized in a reverse sense during the times when said motor is being operated on said first winding providing a full wave rectified D.C. charging current by reverse flow through said transistors to said battery, and resistance means connected between said terminal means and having a connection to the transistor bases for controlling the base current and defining the battery charging rate.

6. An induction motor adapted for selective use on either conventional alternating current or on a battery comprising a stator, a rotor inductively associated with said stator, a first winding on said stator adapted to be connected to such alternating current for driving said rotor, a second winding on said stator having means defining a center tap, a pair of switching transistors having a common connection in their emitter-collector circuits and each further connected in current controlling relation to one half of said second winding providing for current flow first in one flux producing direction through said second winding and then in the other flux producing direction, means forming transistor control windings on said stator connected to effect cotnrol of the base currents of said transistors to effect switching thereof with flux reversals in said stator, means between said second winding center tap and common transistor connection forming terminals for connection to such batttery providing for direct current flow alternately through said transistors and said second winding to effect operation of said motor from said battery, said second winding being inductivley energized in a reverse sense during the times when said motor is being operated on said first winding providing a full wave rectified D.C. charging current by reverse flow through said transistors to said battery, a voltage divider connected between said terminal means with an intermediate connection to the transistor bases through said control winding means for controlling the base current and defining the battery charging rate.

7. The motor of claim 6 in which said voltage divider consists of two resistances with one of said resistances being variable to vary the said charging rate when operated on A.C. and the motor speed and torque when operating on D.C.

References Cited by the Examiner
UNITED STATES PATENTS

| 2,995,690 | 8/1961 | Lemon | 318—138 |
| 3,044,023 | 7/1962 | Floyd | 331—113 |
| 3,083,326 | 3/1963 | Deming et al. | 318—138 |
| 3,098,958 | 7/1963 | Katz | 318—138 |
| 3,175,167 | 3/1965 | Lloyd | 318—138 X |
| 3,240,947 | 3/1966 | Mas | 290—50 |

ORIS L. RADER, *Primary Examiner.*

G. SIMMONS, *Assistant Examiner.*